(12) United States Patent
Diaz

(10) Patent No.: US 11,026,412 B1
(45) Date of Patent: Jun. 8, 2021

(54) FISHING BUCKET

(71) Applicant: Fermin A. Diaz, Naples, FL (US)

(72) Inventor: Fermin A. Diaz, Naples, FL (US)

( * ) Notice: Subject to any disclaimer, the term of this patent is extended or adjusted under 35 U.S.C. 154(b) by 0 days.

(21) Appl. No.: 17/008,735

(22) Filed: Sep. 1, 2020

(51) Int. Cl.
*A01K 97/05* (2006.01)
*A01K 97/10* (2006.01)

(52) U.S. Cl.
CPC .............. *A01K 97/05* (2013.01); *A01K 97/10* (2013.01)

(58) Field of Classification Search
CPC ................................ A01K 97/05; A01K 97/10
USPC ........................................................... 43/21.2
See application file for complete search history.

(56) References Cited

U.S. PATENT DOCUMENTS

| | | | | |
|---|---|---|---|---|
| 3,659,369 A * | 5/1972 | Hermanson | ............ | A01K 97/10 43/21.2 |
| 3,667,708 A * | 6/1972 | Smeltzer | ................ | A01K 97/10 248/512 |
| 4,106,811 A * | 8/1978 | Hernandez | ............. | A01K 97/10 248/538 |
| 4,845,881 A * | 7/1989 | Ward | ...................... | A01K 97/22 43/21.2 |
| 5,131,179 A * | 7/1992 | McEwen | ................. | A01K 97/05 206/315.11 |
| 5,319,877 A * | 6/1994 | Hagan | .................... | A01K 97/06 43/54.1 |
| 5,321,904 A * | 6/1994 | Benson | .................. | A01K 97/10 211/70.8 |
| 5,335,440 A * | 8/1994 | Williams | ............... | A01K 97/10 248/538 |
| 5,491,923 A * | 2/1996 | Zingrone | ............... | A01K 97/01 248/538 |
| 6,253,484 B1 * | 7/2001 | O'Connor | .............. | A01K 97/10 248/213.2 |
| 6,883,268 B2 * | 4/2005 | Fraser | ..................... | A01K 97/22 206/315.11 |
| 2005/0252071 A1 * | 11/2005 | Urban | ..................... | A01K 97/10 43/21.2 |
| 2006/0196101 A1 * | 9/2006 | Mrotek | .................. | A01K 97/01 43/21.2 |
| 2007/0039230 A1 * | 2/2007 | Burnley | ................. | A01K 97/10 43/21.2 |
| 2008/0185493 A1 * | 8/2008 | Wakefield | .............. | A01K 97/06 248/512 |
| 2009/0278005 A1 * | 11/2009 | Bacarella | ............... | A01K 97/01 248/205.1 |
| 2012/0007391 A1 * | 1/2012 | McCaslin | .............. | A01K 97/22 297/183.1 |
| 2013/0227875 A1 * | 9/2013 | DeSpiegelaere | ....... | A01K 97/06 43/54.1 |
| 2014/0331543 A1 * | 11/2014 | Hancock | ................ | A01K 97/10 43/17 |

(Continued)

*Primary Examiner* — Christopher P Ellis
(74) *Attorney, Agent, or Firm* — Bryan L. Loeffler, Esq.; Loeffler IP Group, P.A.

(57) ABSTRACT

A fishing bucket (1) having one or more fishing rod holders (7) secured to a sidewall (4) of a bucket (2) in a manner that does not penetrate or weaken the sidewall, thereby still allowing the bucket to be utilized for transport and storage of fishing equipment and more importantly for holding water, bait, caught fish and so forth while fishing without leaking. The fishing bucket is ideal for anglers who need to carry/haul fishing gear to a desired fishing spot and need a fishing pole and live bait/fish holder while fishing.

4 Claims, 5 Drawing Sheets

(56) References Cited

U.S. PATENT DOCUMENTS

| | | | | |
|---|---|---|---|---|
| 2016/0021861 A1* | 1/2016 | Pippins | ............... | A01K 97/10 43/17.5 |
| 2016/0120163 A1* | 5/2016 | Arden | ............... | A01K 97/05 43/57 |
| 2017/0231209 A1* | 8/2017 | Pippins | ............... | F21V 23/0471 43/17 |

* cited by examiner

FISHING BUCKET

FIELD OF THE INVENTION

This invention relates to devices used for transporting and holding fishing gear and more particularly a bucket having one or more fishing rod holders secured to a sidewall of the bucket in a manner that does not penetrate or weaken the sidewall, thereby still allowing the bucket to be utilized for transport and storage of fishing equipment and more importantly for holding water, bait, caught fish and so forth while fishing.

BACKGROUND OF THE INVENTION

There are many forms of fishing, such as surf fishing and pier fishing. Surf fishing is the sport of catching fish while standing on a shoreline or wading in surf. Surf fishing is often conducted from a beach or shoreline that requires a fisherman to walk some distance carrying whatever fishing gear is required in for the chosen locale. Many fishermen also fish from piers, docks, and bridges, which require carrying fishing gear.

Fishing equipment may include one or more rods and reels, a tackle box, bait, a cast net and so forth. This equipment can be cumbersome to carry, which is why so many anglers use buckets that double as carriers while walking to a fishing spot and a holder for water, bait and caught fish while fishing.

Unfortunately, space in a conventional five-gallon bucket is limited and if an angler places a rod and attached reel into the bucket, it is usually stuffed in there with other gear that can scratch and damage the reel.

Others have attempted to solve this problem by directly attaching tubular rod holders to an outer wall of a bucket using bolts. However, piercing the perimeter wall of a bucket weakens the structural integrity of the bucket and causes leaks.

Therefore, a need exists for a fishing bucket having one or more fishing rod holders secured to a sidewall in a manner that does not penetrate or weaken the sidewall, thereby still allowing the bucket to be utilized for transport and storage of fishing equipment and more importantly for holding water, bait, caught fish and so forth while fishing.

SUMMARY OF THE INVENTION

The primary object of the present invention is to provide a fishing bucket having one or more fishing rod holders secured to a sidewall in a manner that does not penetrate or weaken the sidewall, thereby still allowing the bucket to be utilized for transport and storage of fishing equipment and more importantly for holding water, bait, caught fish and so forth while fishing.

An additional object of the present invention is to provide a fishing bucket having one or more fishing rod holders secured to a sidewall in an offset position that provides additional stability to the fishing bucket.

An additional object of the present invention is to provide a fishing bucket having one or more fishing rod holders secured to a sidewall in an offset position allows a handle on the bucket to still have a full range of motion.

The present invention fulfills the above and other objects by providing a fishing bucket having at least one fishing rod holder secured to a sidewall using brackets and attachments that does not penetrate or weaken the sidewall, thereby still allowing the bucket to be utilized for transporting and holding heavy fishing equipment and more importantly for holding water, bait, caught fish and so forth without the bucket leaking.

The at least one fishing rod holder preferably has a hollow tubular-shaped body for receiving a handle of a fishing rod. A slot is located on an upper edge of the at least one fishing rod holder to accommodate a post of a reel attached to the handle of the fishing rod. A bracket is attached to an outer surface of the at least one fishing rod holder and to an outer surface of the bucket to hold the fishing rod holder in an off-set position spaced away from the bucket to prevent the at least one fishing rod holder from interfering with a conventional wire handle or rope handle pivotally attached to an outer surface of the bucket.

The bracket preferably has at least one arm connecting a bucket facing surface to a fishing rod holder facing surface. The bucket facing surface and the fishing rod holder facing surface are both preferably curved, wherein the fishing rod holder facing surface is preferably curved and/or C-shaped to hug the tubular-shaped body of the fishing rod holder.

The curved surfaces of the bucket facing surface and the curved surface of the fishing rod holder facing surface provide additional surface area for contact between the bracket and the bucket, and the bracket and the fishing rod holder, respectively. This allows for an attachment, such as an adhesive, heat weld or so forth to be used to attach the bracket to the bucket and the bracket to the fishing rod holder, respectively. This eliminates the need to use conventional fasteners, such as screws and bolts, to attach fishing rod holders to a bucket.

The above and other objects, features and advantages of the present invention should become even more readily apparent to those skilled in the art upon a reading of the following detailed description in conjunction with the drawings wherein there is shown and described illustrative embodiments of the invention.

BRIEF DESCRIPTION OF THE DRAWINGS

In the following detailed description, reference will be made to the attached drawings in which.

DESCRIPTION OF THE PREFERRED EMBODIMENTS

Figure 1:
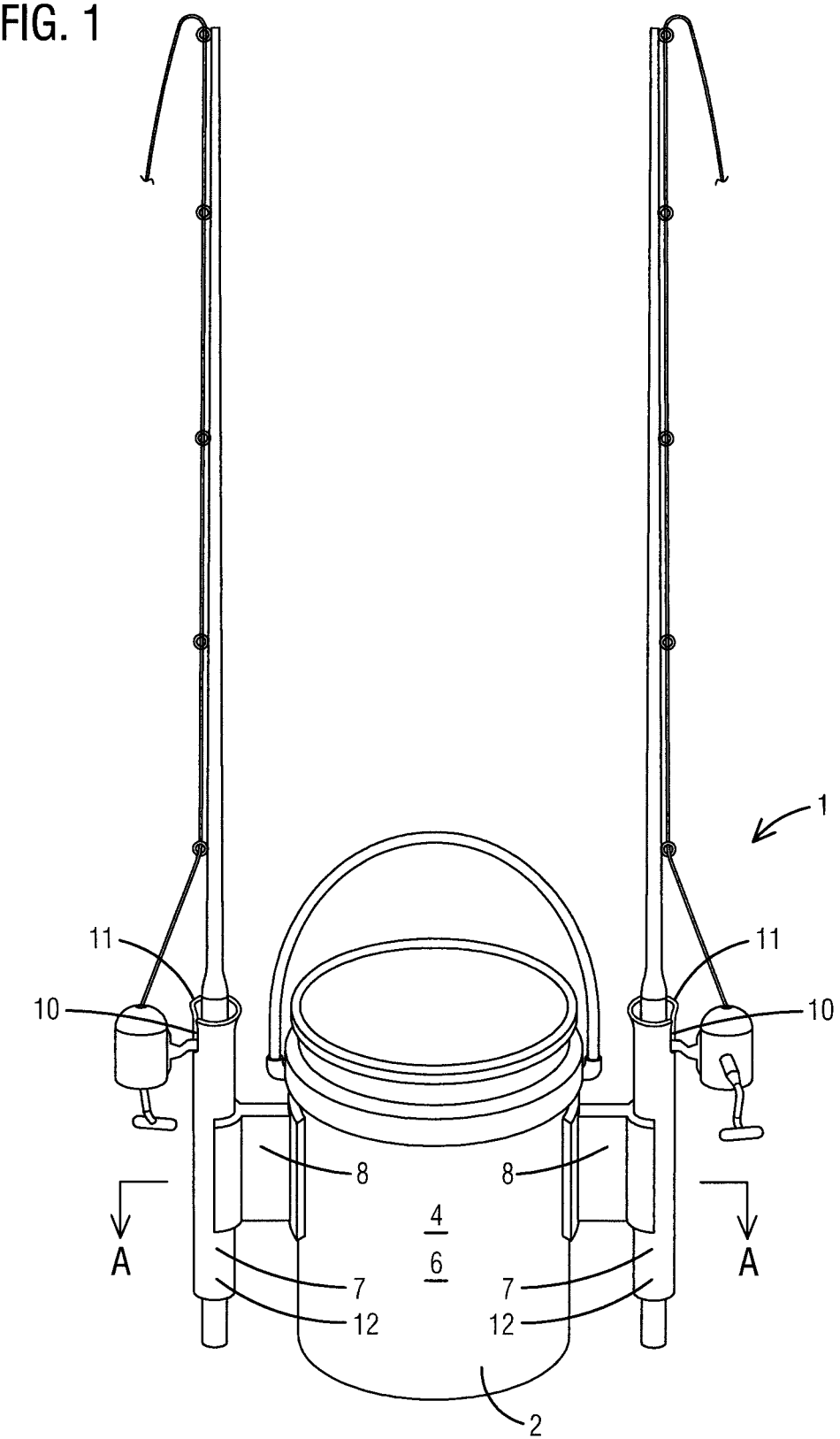
FIG. 1 is a font view of a fishing bucket of the present invention in use holding fishing rods.
Figure 2:
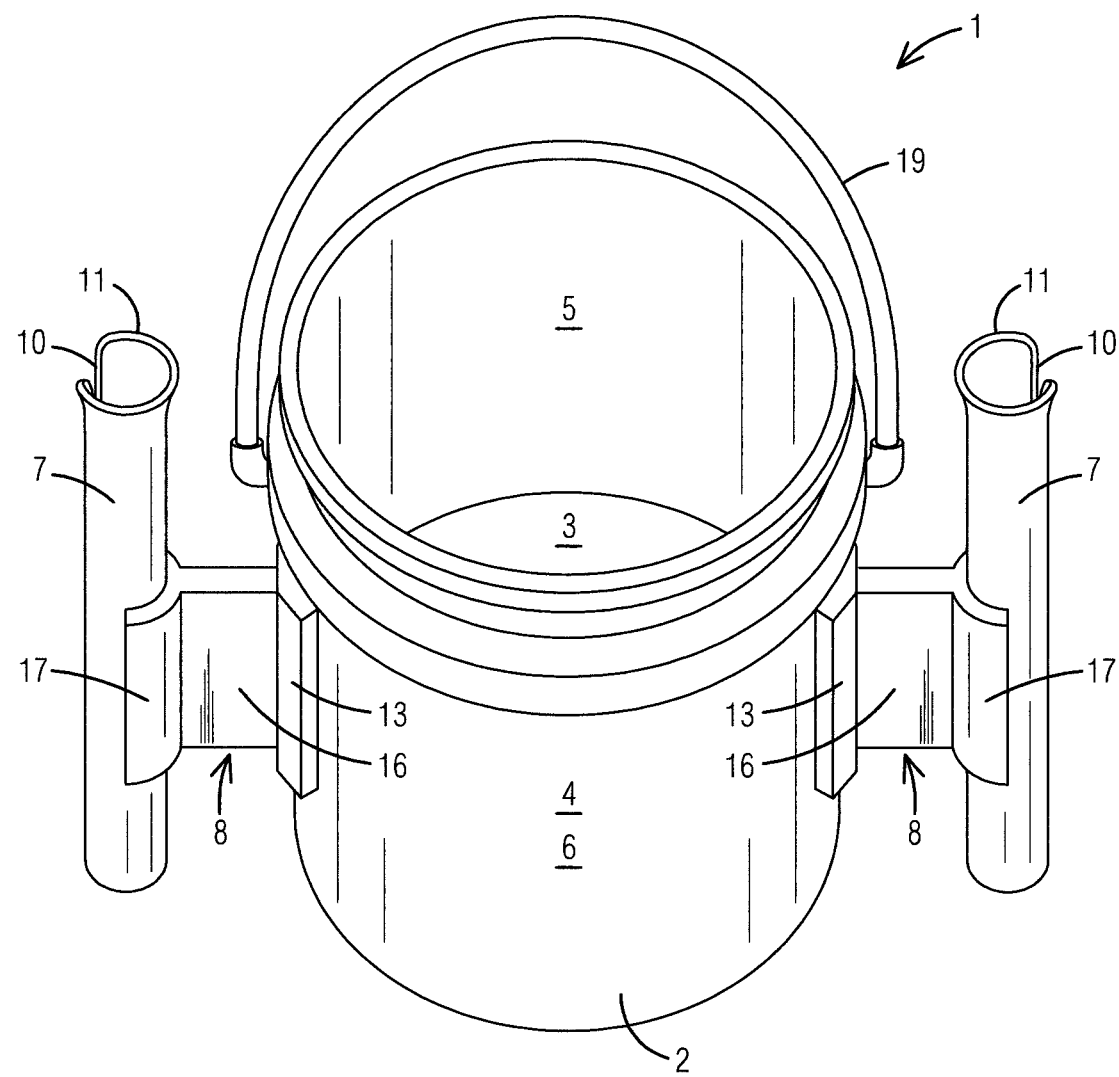
FIG. 2 is a top perspective view of the fishing bucket of the present invention.

For purposes of describing the preferred embodiment, the terminology used in reference to the numbered accessories in the drawings is as follows:

1. fishing bucket, generally
2. bucket
3. circular base of bucket
4. side wall of bucket
5. inner surface of bucket
6. outer surface of bucket
7. fishing rod holder 8. bracket
9. attachment means
10. slot
11. upper edge of fishing rod holder
12. outer surface of fishing rod holder
13. base
14. bucket facing surface of bracket
15. adhesive
16. arm
17. distal end of arm
18. rod holder facing surface
19. handle
20. mechanical fastener With reference to FIGS. 1 and 2, a fishing bucket 1 of the present invention is illustrated. The fishing bucket 1 comprises a bucket 2 having a circular base 3, sidewall 4, inner surface 5 and outer surface 6. At least one tubular-shaped fishing rod holder 7 is attached to the outer surface 6 of the bucket 2 using a bracket 8 and an attachment means 9, such as adhesive, epoxy, heat welding and so forth, to attach the bracket 8 to the bucket 2, thereby eliminating the need for puncturing the sidewall 4 of the bucket 2.

Figure 3:
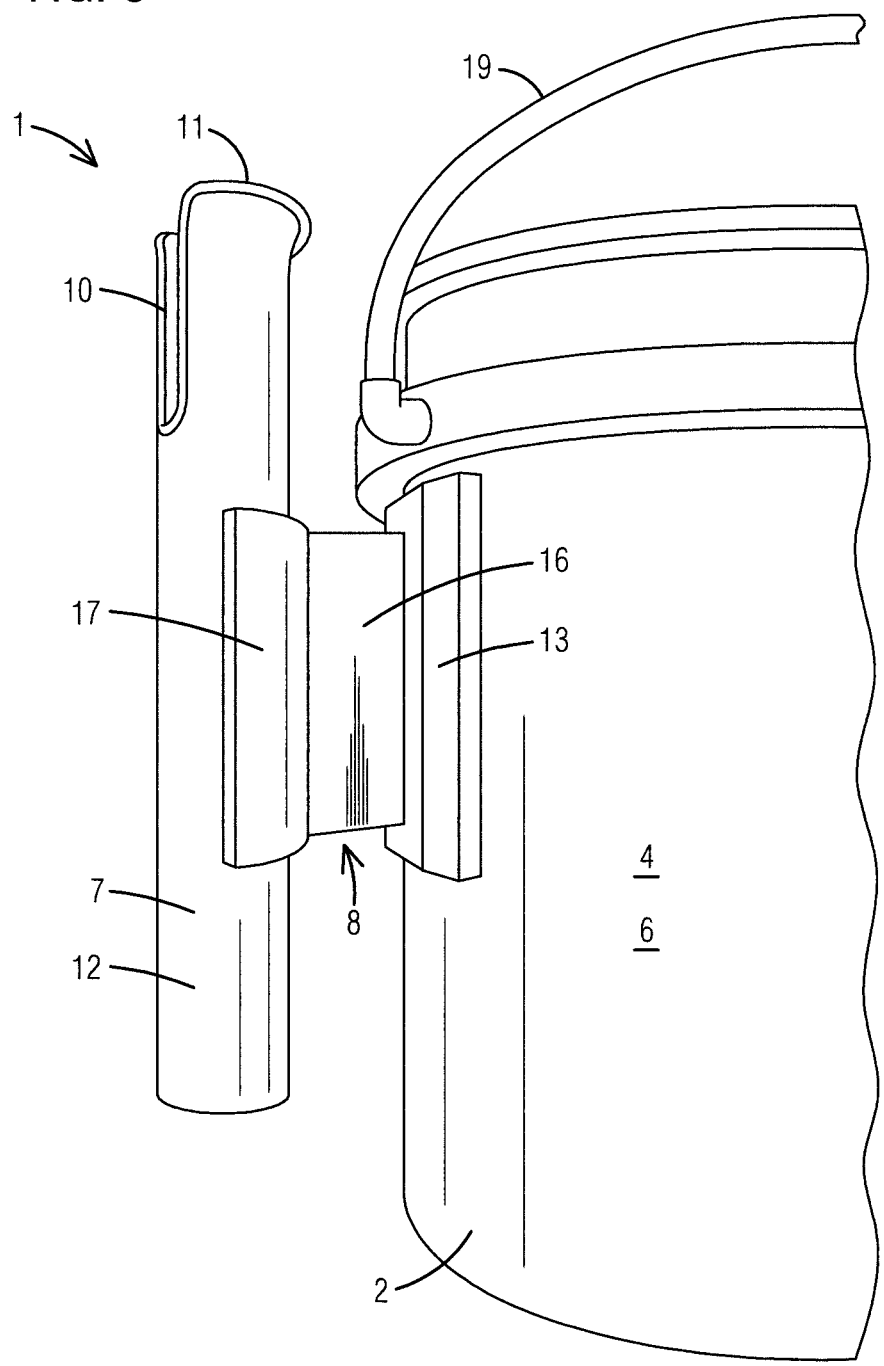
FIG. 3 is a closeup side view of a bracket of the present invention securing a fishing rod holder to a bucket sing and adhesive.

The at least one fishing rod holder 7 preferably comprises a hollow tubular-shaped body for receiving a handle of a fishing rod, as illustrated in FIG. 3. A slot 10 is preferably located on an upper edge 11 of the at least one fishing rod holder 7 to accommodate a post of a reel attached to the handle of the fishing rod, as illustrated in FIG. 1.

The bracket 8 attaches to an outer surface 12 of the at least one fishing rod holder 7 and to the outer surface 6 of the bucket 2 and holds the at least one fishing rod holder 7 in an off-set position spaced away from the outer surface 6 and sidewall 4 of the bucket 2 to prevent the at least one fishing rod holder 7 from interfering with a handle 19, such as a conventional wire handle or rope handle, attached to the sidewall 4 of the bucket 2.

Figure 4:
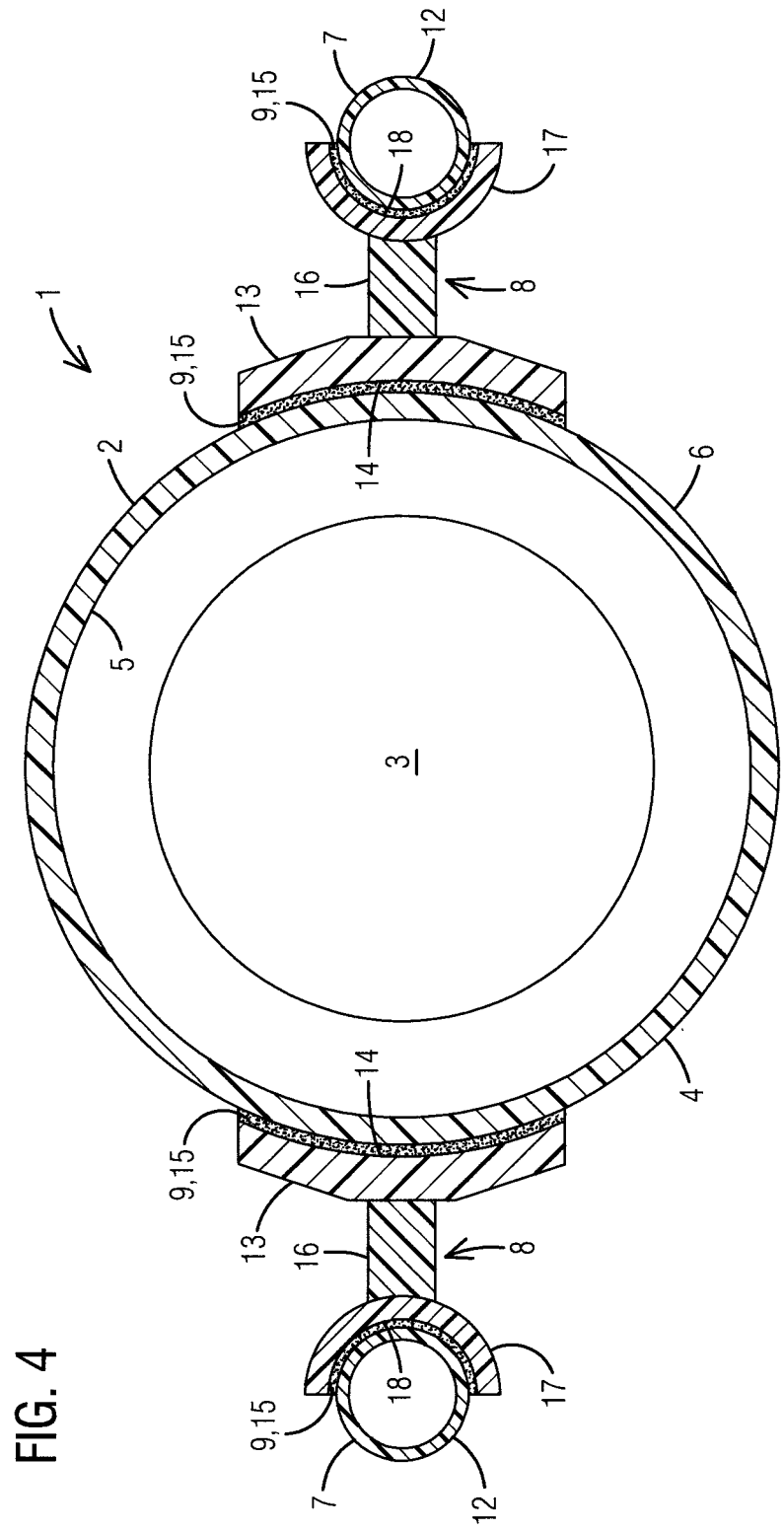
FIG. 4 is a top sectional view along lines A-A of FIG. 1 of the fishing bucket of the present invention.

The bracket 8 comprises a base 13 having a bucket facing surface 14 that attaches to the outer surface 6 of the bucket 2 via an non-piercing attachment means 9, such as adhesive 15, as illustrated in FIG. 4, epoxy, heat weld and so forth. At least one arm 16 extends horizontally from the base 13 and connects the base 13 to a distal end 17 having a fishing rod holder facing surface 18 that attaches to an outer surface 12 of the at least one fishing rod holder 7 via an attachment means 9, such as adhesive 15, as illustrated in FIG. 4, epoxy, heat weld and so forth, or a mechanical fastener 20, such as one or more nuts and bolts, as illustrated in FIG. 5.

The bucket facing surface 14 of the bracket 8 is preferably curved or C-shaped to hug the outer surface 6 and sidewall 4 of the bucket 2 to increase the surface area making contact. Likewise, the fishing rod holder facing surface 18 is preferably curved or C-shaped to hug the outer surface 12 of the at least one fishing rod holder 7 to increase the surface area making contact.

Figure 5:
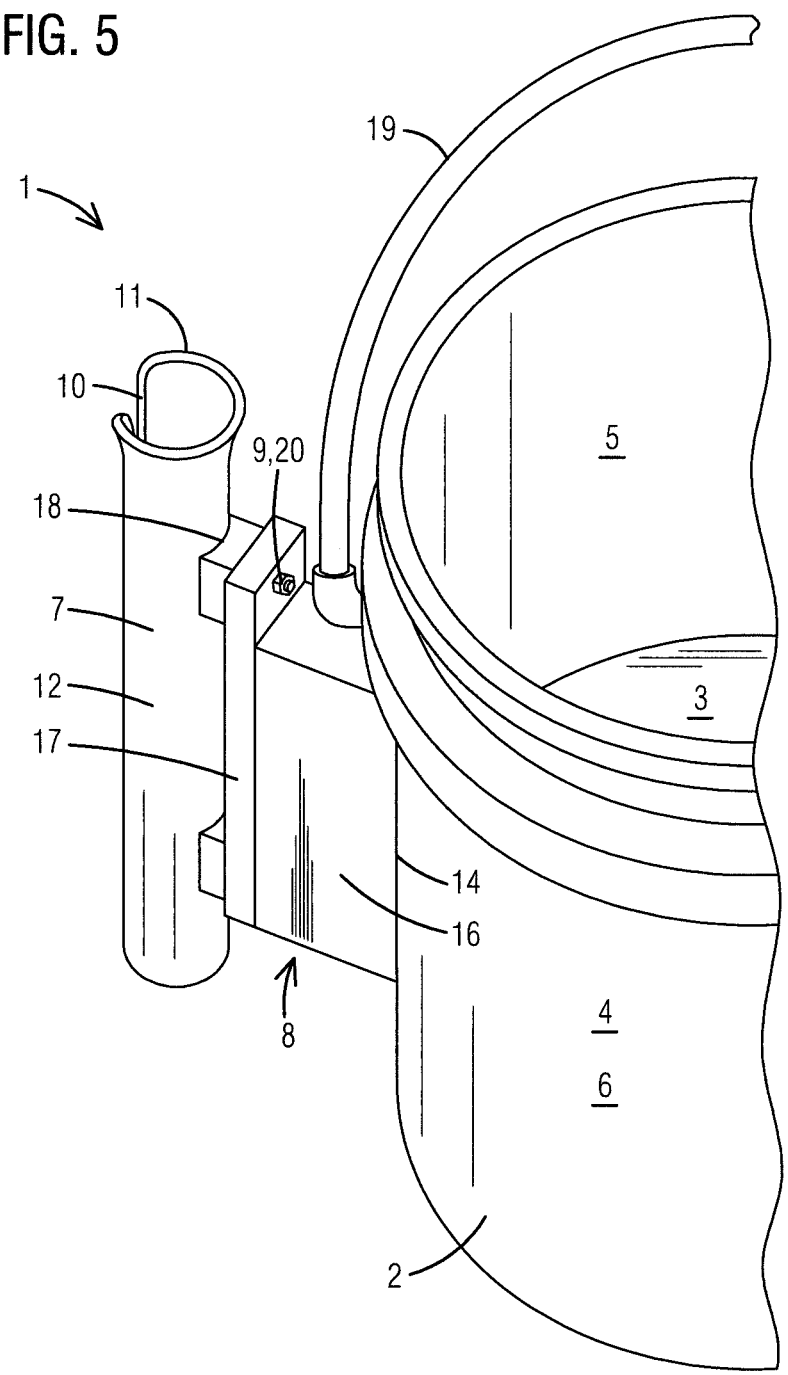
FIG. 5 is a closeup side view of a bracket of the present invention securing a fishing rod holder to a bucket using a mechanical fastener.

The fishing rod holder facing surface 18 may also be flat and have at least one aperture for connecting the fishing rod holder 7 to the bracket 8 using at least one mechanical fastener 20, such as one or more nuts and bolts, as illustrated in FIG. 5.

The bracket 8 may be straight with the fishing rod holder facing surface 18 being parallel with the bucket facing surface 14 or angled with the fishing rod holder facing surface 18 being angled in relation to the bucket facing surface 14. The angled bracket 8 may be used on a bucket with an angled side wall so the fishing rod holder 7 stands straight up when the bucket is placed on a level surface.

It is to be understood that while a preferred embodiment of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

Having thus described my invention, I claim:

1. A fishing bucket for transporting and holding fishing gear comprising:
   a bucket having a circular base, sidewall, inner surface and outer surface;
   a handle having a first end and a second end each extending from opposing outer surfaces of said sidewall of the bucket;
   a first tubular-shaped fishing rod holder attached to the outer surface of the sidewall of the bucket in a fixed upright position using a first bracket to hold the first fishing rod holder in an off-set position wherein a top end of the first tubular-shaped fishing rod holder is spaced away from the outer surface and sidewall of the bucket to prevent the first fishing rod holder from interfering with movement of the handle in relation to the bucket; and
   said first tubular-shaped fishing rod holder being parallel to the sidewall of the bucket;
   said first bracket having an arm extending perpendicularly between said side wall of the bucket and said first tubular-shaped fishing rod holder;
   said top end of the first tubular-shaped fishing rod holder, arm of said first bracket, and sidewall create a first U-shaped space within which the handle may still fully pivot in relation to the sidewall of the bucket;
   a second tubular-shaped fishing rod holder attached to the outer surface of the sidewall of the bucket in a fixed upright position using a second bracket to hold the second fishing rod holder in an off-set position wherein a top end of the second tubular-shaped fishing rod holder is spaced away from the outer surface and sidewall of the bucket to prevent the second fishing rod holder from interfering with movement of the handle in relation to the bucket; and
   said second tubular-shaped fishing rod holder being parallel to the sidewall of the bucket;
   said second bracket having an arm extending perpendicularly between said side wall of the bucket and said second tubular-shaped fishing rod holder;
   said top end of the second tubular-shaped fishing rod holder, arm of said second bracket, and sidewall create a first U-shaped space within which the handle may still fully pivot in relation to the sidewall of the bucket.

2. The fishing bucket of claim 1 wherein:
   an adhesive is used to attach the bracket to the bucket.

3. The fishing bucket of claim 1 wherein:
   said bracket comprises a base having a bucket facing surface having a curved surface that makes direct contact with the outer surface of the bucket.

4. The fishing bucket of claim 2 wherein:
   said bracket comprises a base having a bucket facing surface having a curved surface that makes direct contact with the outer surface of the bucket.

* * * * *